United States Patent [19]

Woo

[11] Patent Number: 4,500,111
[45] Date of Patent: Feb. 19, 1985

[54] SUSPENSION ASSEMBLY FOR A WHEEL AND BRAKE

[75] Inventor: Ji Y. Woo, South Bend, Ind.

[73] Assignee: The Bendix Corporation, Southfield, Mich.

[21] Appl. No.: 543,571

[22] Filed: Oct. 19, 1983

Related U.S. Application Data

[63] Continuation of Ser. No. 217,724, Dec. 18, 1980, abandoned.

[51] Int. Cl.³ .............................................. B60T 1/06
[52] U.S. Cl. .................................. 280/688; 180/905; 188/18 R; 280/690
[58] Field of Search ..................... 280/688, 690, 692; 188/18 R, 18 A, 58, 59, 206 A, 333, 335, 340, 341

[56] References Cited

U.S. PATENT DOCUMENTS

| | | | |
|---|---|---|---|
| 1,564,733 | 12/1975 | Weaver | 180/905 |
| 2,547,268 | 4/1951 | Jacobi | 280/75 |
| 2,708,586 | 5/1955 | Wagner | 280/682 |
| 3,109,519 | 5/1963 | Dombeck | 188/73 |
| 3,414,287 | 12/1968 | Weiertz | 280/692 |
| 3,580,345 | 5/1971 | Brown et al. | 188/59 |
| 3,908,480 | 9/1975 | Afanador et al. | 74/511 |
| 4,061,429 | 12/1977 | Mathues | 188/206 A |
| 4,150,736 | 4/1979 | Marti | 188/332 |
| 4,223,903 | 9/1980 | Grabb et al. | 280/96.1 |
| 4,260,176 | 4/1981 | Pacis et al. | 280/692 |

FOREIGN PATENT DOCUMENTS

| | | |
|---|---|---|
| 411509 | 3/1923 | Fed. Rep. of Germany . |
| 1114828 | 4/1956 | France . |
| 1292488 | 11/1972 | United Kingdom . |

Primary Examiner—Richard A. Bertsch
Attorney, Agent, or Firm—Ken C. Decker

[57] ABSTRACT

A suspension assembly couples a wheel assembly (16) and a brake assembly (60) to a frame (10). The suspension assembly includes a support (20) for receiving an axle (24). The axle carries the wheel assembly (16) at one end of the support (20) and forms a drum (46) at the other end of the support (20) for engagement with the brake assembly (60). Therefore, the support (20) separates the wheel assembly (16) from the brake assembly (60) so that the brake assembly (60) brakes the wheel assembly (16) via the axle (24).

3 Claims, 3 Drawing Figures

SUSPENSION ASSEMBLY FOR A WHEEL AND BRAKE

This is a continuation of application Ser. No. 217,724, filed Dec. 18, 1980, now abandoned.

The invention relates to a suspension assembly for a wheel and brake which couples a wheel and a brake to a vehicle frame.

Suspension assemblies provide a support such as a tube for rotatably carrying an axle. The tube terminates in a mounting flange for carrying a brake assembly and the axle terminates in a flange for carrying a drum which is engageable with the brake assembly. The axle flange also carries a wheel adjacent the drum.

In a front wheel drive vehicle, the weight of the vehicle engine is primarily carried by the front wheels. Also during braking in a forward direction, the change in velocity causes the weight of the vehicle to shift to the front wheels. Therefore, during braking the brakes associated with the front wheels in a front wheel drive vehicle perform most of the braking for the vehicle. This leaves the brakes associated with the rear wheels to develop substantially less drag than the front brakes.

Because of the increased braking effort by the front wheels, vehicle manufacturer's provide disc brakes for the front wheels and drum brakes for the rear wheels. Because the rear drum brakes are more efficient than required for lightweight small cars, the braking systems for these cars include proportioning valves to further reduce the braking of the rear drum brakes by reducing the fluid pressure communicated to the rear brakes during braking. Although the size of the drum brake could be reduced in diameter to further reduce the braking effort for the rear wheels, the location of the drum and brake assembly adjacent the axle flange substantially prevents reduction in size so that reliance on proportioning valves is continuing with the state of the art.

The invention provides a suspension assembly which accommodates a small diameter brake assembly. The invention is characterized by a vehicle frame support with an opening for rotatably receiving an axle. The axle connects with a wheel assembly at one end of the support and is engageable with a brake assembly at the other end of the support remote from a wheel assembly. During a brake application, the brake assembly brakes the wheel via the axle.

It is an advantage of the invention that the wheel assembly and brake assembly are separated from each other by the frame support to permit sufficient reductions in size for the brake assembly. In addition, the support for the vehicle frame can be juxtapositioned to the wheel assembly to widen the support for the vehicle frame.

One way of carrying out the invention is described in detail below with reference to the drawings which illustrate only one specific embodiment, in which.

Figure 1:
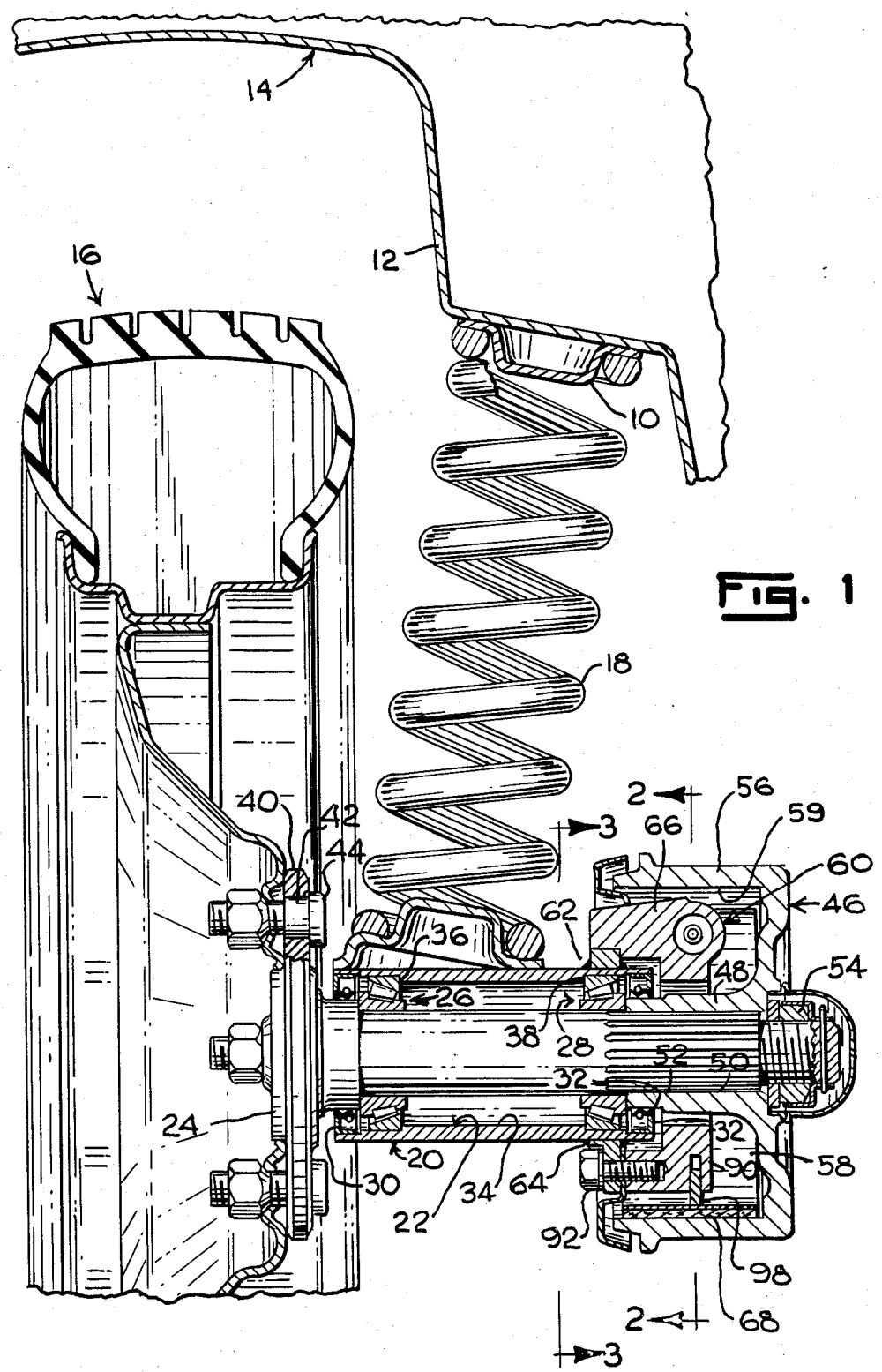
FIG. 1 is a front view, partly in cross-section, of a suspension assembly and brake assembly constructed in accordance with the present invention.

A vehicle frame 10 is secured to a body 12 which carries the occupants of the vehicle. The frame 10 can be integrally formed with the body 12 as a unibody construction or it can be separate from the body 12. The body 12 forms a wheel well 14 to accommodate the space occupied by a wheel assembly 16. A spring 18 resiliently carries the body relative to a support 20. In order to dampen oscillation between the body or frame and the support 20, a shock absorber (not shown) is generally provided between the frame 10 and the support 20.

The support 20 defines an opening 22 extending axially therethrough. An axle 24 is rotatably disposed within the opening 22 by means of a pair of bearing assemblies 26 and 28. A pair of sealing rings 30 and 32 are carried at each end of the support 20 to prevent the introduction of contaminants, such as, dirt or water into the opening 22. The wall 34 of opening 22 is stepped to form shoulders 36 and 38, the shoulder 36 abutting bearing assembly 26 and the shoulder 38 abutting bearing 28.

The axle 24 terminates in a radially-outwardly extending flange 40 at one end of the support 20 outside the opening 22. The flange 40 is apertured at 42 to receive studs 44 which cooperate with nuts to releasably secure the wheel assembly 16 to the axle flange 40. The axle 24 includes a drum 46 at the other end of support 20. An inner boss 48 on the drum is splined at 50 to mesh with associated splines 52 on the axle 24 so that, when the drum is secured to the axle via nut 54, the drum 46 rotates with the axle 24. In the alternative, the drum could be integrably formed with the axle. The inner boss 48 extends slightly into the opening and is engageable with the bearing assembly 28 to axially position the latter between the support 20 and the axle 24. The inner boss also engages the sealing ring 32. The drum 46 defines an outer rim 56 with an inner surface 59. The rim 56 and boss 48 extend axially toward the support 20 to define an annular cavity 58.

Figure 2:
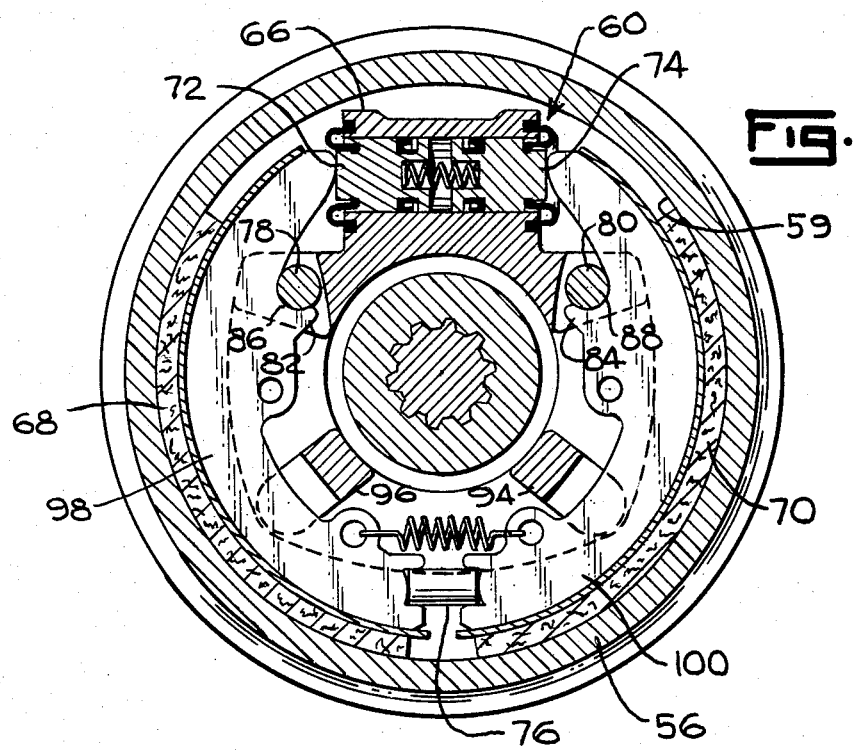
FIG. 2 is a cross-sectional view taken along line 2—2 of FIG. 1.

In order to control braking for the wheel assembly 16, a drum brake assembly 60 is secured to the support 20 via welding at 62 or other suitable fastening techniques so that the drum brake assembly 60 is disposed within cavity 58 for engagement with surface 59 of rim 56. The drum brake assembly 60 includes a torque plate 64 welded to the support 20 and carrying a wheel cylinder 66 which cooperates with a pair of brake shoes 68 and 70. Viewing FIG. 2, the wheel cylinder 66 carries a pair of pistons 72 and 74 which are engageable with respective brake shoes 68 and 70 to move the latter from a nonbraking position to a braking position in engagement with the rim surface 59. A floating spacer 76 is carried between the brake shoes opposite the wheel cylinder so that the drum brake operates in a duo-servo manner with the brake shoes rotating slightly with the drum 46. In order to absorb braking torque, the torque plate 64 is provided with a pair of axially protruding abutments 78 and 80. Each brake shoe, 68 and 70, is provided with a projection, 82 and 84, defining a recess, 86 and 88, for receiving the abutments 78 and 80. If the drum rim 56 is rotating in a clockwise direction in FIG. 2 during braking, the brakeshoe 70 rotates slightly with the rim 56 to bias the brake shoe 68 into engagement with the rim 56 so that abutment 78 takes all of the braking torque. Conversely, if the rim 56 is rotating counterclockwise during braking, the brake shoe 68 rotates slightly with the rim 56 to bias brake shoe 70 into engagement with the rim 56 so that abutment 80 takes all of the braking torque.

Figure 3:
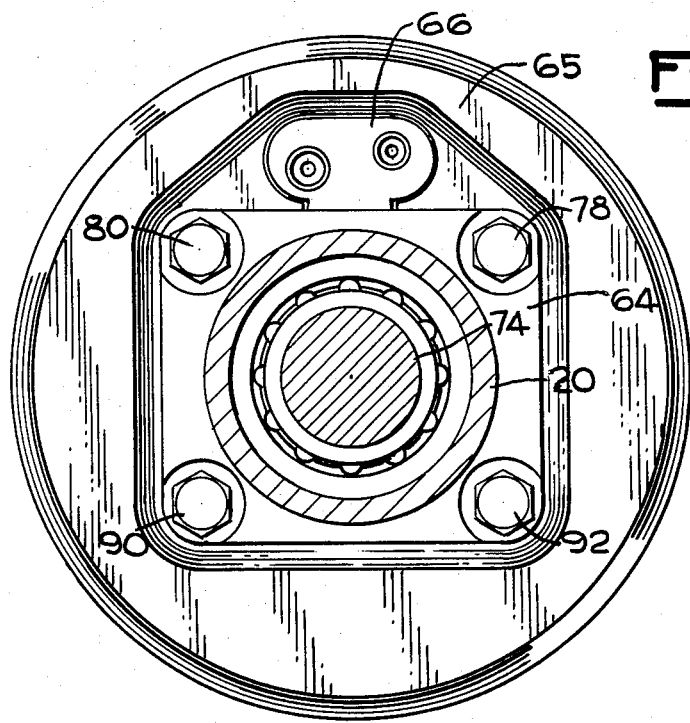
FIG. 3 is a cross-sectional view taken along line 3—3 of FIG. 1.

Turning to FIG. 3, the torque plate 64 is substantially rectangular in shape except for a top portion 65 carrying the wheel cylinder 66. The upper corners of the rectangular torque plate are apertured to receive abutments 78 and 80 in the form of bolts secured to the torque plate. The lower corners of the torque plate are apertured to receive bolts 90 and 92, which secure lugs 94 and 96. The lugs are slotted to receive and guide the webs 98 and 100 of brake shoes 68 and 70, respectively.

In the preferred embodiment, the rim surface 59 defines a diameter of 12.7 cm and is smaller in diameter than the outer periphery of axle flange 40. The axial width for the rim 56 is 6.6 cm and is substantially equal to the radius defined by the rim surface 59 which is 6.35 cm. The drum brake assembly 60 defines a radius of 4.35 cm to the center of the wheel cylinder 66 and a radius of 3.9 cm to the center of the abutments 78 and 80. Consequently, the abutments are located radially inwardly of the wheel cylinder 66.

I claim:

1. A combined wheel mounting and brake assembly for a vehicle having a small lightweight frame with front wheels associated with disc brakes and rear wheels associated with drum brakes, comprising a support fixedly engaging the vehicle frame via a spring engaging the support and the vehicle frame, said support defining an opening extending axially therethrough, and an axle rotatably disposed within said support opening via a pair of bearings carried within said support opening at substantially opposite ends of said support opening, said axle including a first portion at one end of said support outside said one end support opening, said first portion extending radially outwardly of said support opening and releasably mounting one of the rear wheels to said axle, said axle including a second portion at the other end of said support opening, said second portion extending radially outwardly of said support opening and having an axially extending outer rim, said rim substantially defining a cavity for receiving one of the drum brakes which is disposed adjacent said support other end, the one drum brake being operable to brake the rear wheel via said axle, said axially extending rim defining a surface engageable with the one drum brake and said surface defines a diameter dimension which is less than a diameter dimension for the radial outer periphery of said first portion, said second portion defining an inner axially extending boss engageable with said axle and cooperating with one of said pair of bearings to retain the latter within the support opening, said second portion being releasably coupled to said axle via a nut, and said nut cooperates with said axle when said second portion is coupled thereto and cooperating with the one bearing to retain the other of said pair of bearings within the support opening, whereby said pair of bearings are carried within the support opening to one side of the rear wheel in the direction of said second portion.

2. A combined wheel mounting and brake assembly for a vehicle having a small lightweight frame, a support cooperating with said frame via a spring engaging said frame and said support, said support defining an opening extending axially therethrough for receiving an axle, one end of said axle being coupled to said wheel substantially adjacent one end of said support, the other end of said axle carrying a drum cooperating with said brake assembly substantially adjacent the other end of said support, said support other end carrying a torque plate for said brake assembly, and said support rotatably receiving said axle via a pair of bearings disposed substantially at said one and other ends, respectively, whereby said support defines an axial dimension limited substantially by said pair of bearings between said wheel and said brake assembly.

3. The combined wheel mounting and brake assembly of claim 2 in which said spring engages said support substantially between said pair of bearings whereby said wheel is disposed adjacent one side of said spring and said brake assembly is disposed adjacent an opposite side of said spring.

* * * * *